United States Patent
Mageau et al.

(10) Patent No.: US 9,611,608 B2
(45) Date of Patent: Apr. 4, 2017

(54) ZONE FREEZE PIPE

(71) Applicants: Daniel Mageau, Seattle, WA (US); Larry Applegate, Seattle, WA (US)

(72) Inventors: Daniel Mageau, Seattle, WA (US); Larry Applegate, Seattle, WA (US)

(*) Notice: Subject to any disclaimer, the term of this patent is extended or adjusted under 35 U.S.C. 154(b) by 449 days.

(21) Appl. No.: 13/841,913

(22) Filed: Mar. 15, 2013

(65) Prior Publication Data

US 2013/0277017 A1    Oct. 24, 2013

Related U.S. Application Data (60) Provisional application No. 61/616,941, filed on Mar. 28, 2012.

(51) Int. Cl.
 *E02D 3/115* (2006.01)
 *F28D 1/053* (2006.01)
 *F24J 3/08* (2006.01)
 *F28F 13/14* (2006.01)

(52) U.S. Cl.
 CPC .............. *E02D 3/115* (2013.01); *F24J 3/084* (2013.01); *F28D 1/053* (2013.01); *F28F 13/14* (2013.01); *Y02E 10/125* (2013.01)

(58) Field of Classification Search
 CPC  E02D 3/115; E02D 19/14; E21D 1/12; E21D 1/14; F17C 2270/0144; F24J 3/08; F24J 3/084; F28D 1/0475; F28D 7/024; F28D 7/04; F28D 1/053; Y02E 10/18; Y02E 10/12; Y02E 10/125; F28F 13/14
 USPC .............................................. 165/45; 62/260
 See application file for complete search history.

(56) References Cited

U.S. PATENT DOCUMENTS

| | | | | |
|---|---|---|---|---|
| 786,382 | A * | 4/1905 | Reno | E02D 3/115 405/130 |
| 3,648,767 | A * | 3/1972 | Balch | 165/104.19 |
| 4,286,651 | A * | 9/1981 | Steiger | E02D 5/24 165/45 |
| 4,867,229 | A * | 9/1989 | Mogensen | F24J 3/081 165/45 |
| 2012/0144829 | A1* | 6/2012 | Wiggs | F03G 7/04 60/641.2 |

FOREIGN PATENT DOCUMENTS

| | | | |
|---|---|---|---|
| DE | 369694 C | * | 2/1923 |
| DE | 373841 | * | 4/1923 |
| DE | 1240789 B | * | 5/1967 |
| FR | 365030 A | * | 9/1906 |
| FR | 368570 A | * | 12/1906 |
| FR | 2651117 B1 | * | 1/1998 |

* cited by examiner

*Primary Examiner* — Tho V Duong
(74) *Attorney, Agent, or Firm* — Christensen O'Connor Johnson Kindness PLLC (57) ABSTRACT

An apparatus sometime referred to as a freeze pipe and methods of using these apparatus in ground freezing applications is provided. Ground freezing is a temporary ground support technique that is used extensively for groundwater control and ground stabilization in underground construction and deep excavations. The process involves circulating refrigerated liquids through a series of vertically disposed "freeze" pipes to freeze the ground creating a solid barrier that prevents water intrusion and provides structural support for excavation. The freeze pipes are directed to "zone freeze" pipes or the like, which cause the ground to freeze in selected segments along the pipe, also referred to as zones.

18 Claims, 6 Drawing Sheets

ZONE FREEZE PIPE

CROSS-REFERENCE TO RELATED APPLICATION

This application claims the benefit of U.S. Provisional Application No. 61/616,941 filed on Mar. 28, 2012, the disclosure of which is hereby incorporated by reference in its entirety.

BACKGROUND

Ground freezing has been used to stabilize weak/loose soil, shore excavations and cut off groundwater since the 1800's when it was first used in Europe. Since then it has been applied to many hundreds of projects where other types of ground improvement or shoring were not effective. Conventional uses of ground freezing include, but are not limited to: vertical frozen soil shoring around an excavation to temporarily cut off groundwater and retain soil, horizontal freezing outside a shaft to stabilize the ground during tunnel boring machine (TBM) mining, horizontal freezing through a railroad or highway embankments to stabilize ground during pipe jacking, deep circular frozen soil shoring for construction of a TBM access shafts.

Figure 1:
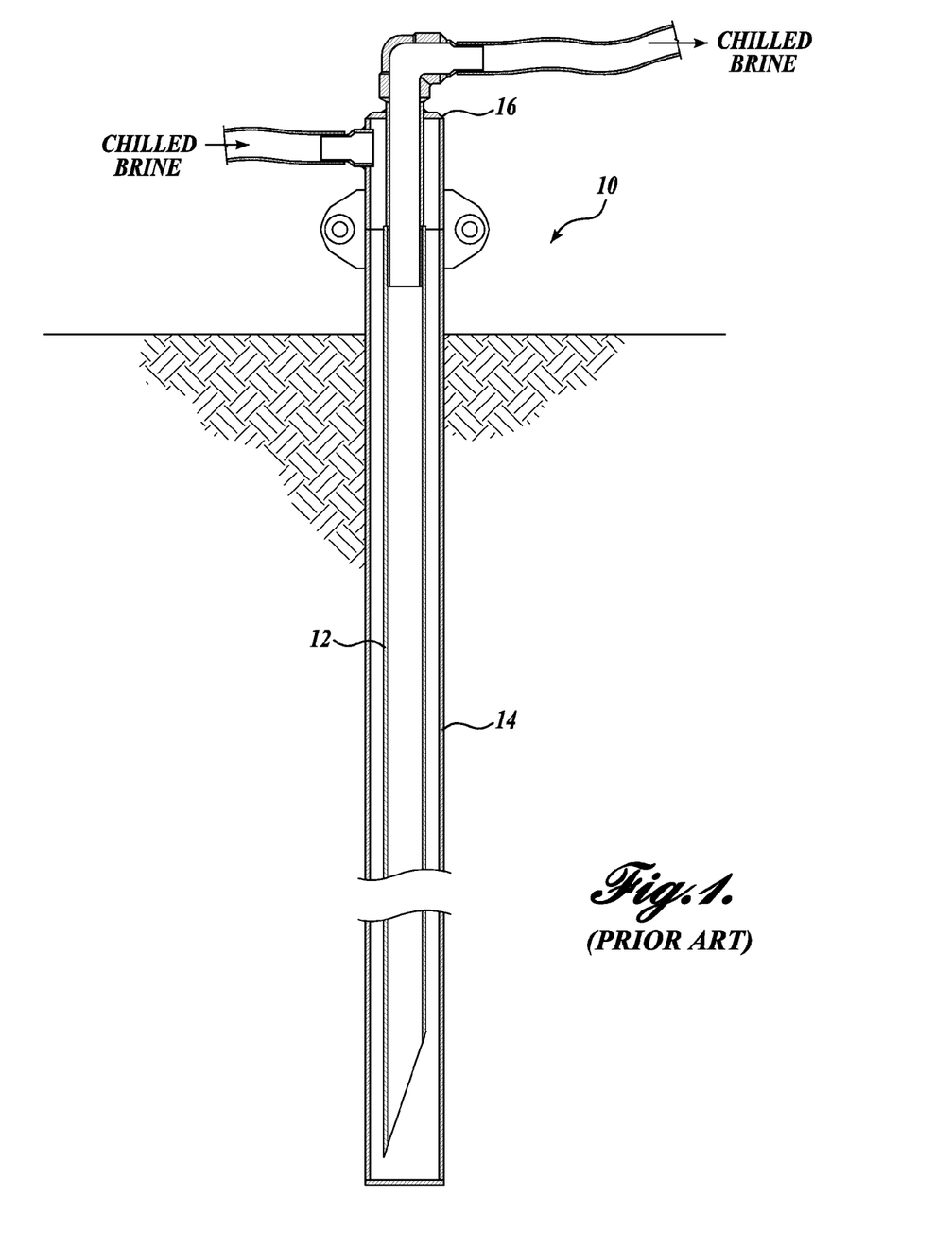
FIG. 1 illustrates a conventional FFP pipe employed in ground freezing applications.

Typically, ground freezing employs a freeze plant, such as a chiller, connected to manifold lines that in turn feed into a series of vertical freeze pipes, installed around the perimeter of a site. Conventional freeze pipes consist of welded steel pipe ranging from 3 to 6 inches in diameter. As best shown in FIG. 1, a center pipe 12 of smaller diameter is disposed inside the outer steel pipe 14 to allow chilled brine to flow down from the top of the freeze pipe 10, along the outside annulus of the center pipe 12, and circulate evenly throughout its entire length. This type of conventional freeze pipe is termed "Full Freeze Pipe (FFP), since it freezes the soil from the ground surface to the bottom of the pipe. The brine then flows back up through the smaller center pipe 12. A steel head 16 fits on the top of the freeze pipe 10 to separate the inflowing and outflowing brine. Brine, usually a calcium chloride solution, is then pumped through the chillers and the freeze pipes at temperatures that can ultimately reach −20° F. or colder.

Frozen soil begins to occur immediately around each freeze pipe when chilled brine is circulated through the system. Since brine is circulated evenly throughout the entire length of the freeze pipe, the frozen soil formation extends from the ground surface to the tip of the freeze pipe. The frozen soil usually forms as a cylinder around each pipe, and can extend to well over 4 feet in radius over time. For the most common application, vertical shoring around a site or shaft, freeze pipes are usually spaced at 3 to 5 feet apart so that over time, a solid wall of frozen soil forms around the site from the ground surface to the bottom of the freeze pipe. Frozen soil is essentially impermeable and very strong (some frozen soil can be nearly ½ the strength of concrete), resulting in a very effective technique for groundwater cutoff and shoring during excavation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a freeze pipe is provided. The freeze pipe includes an upper section having a first heat transfer coefficient, and a lower section coupled to the upper section. The lower section in some embodiments has a second heat transfer coefficient that is higher than the first heat transfer coefficient of the upper section.

In accordance with another aspect of the present disclosure, a freeze pipe is provided. The freeze pipe includes a plastic upper casing defining an upper cavity, a metal lower casing defining a lower cavity, the metal lower casing coupled to the plastic upper casing, a plastic supply line extending through the upper cavity and disposed in fluid communication with the lower cavity, and a plastic return line extending through the upper cavity and disposed in fluid communication with the lower cavity. The plastic return line in some embodiments is spaced apart from the plastic supply line, and the plastic return and supply lines are disposed in non-contact relationship with the plastic upper casing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of apparatuses and methods of using these apparatus in ground freezing applications. Ground freezing is a temporary ground support technique that is used extensively for groundwater control and ground stabilization in underground construction and deep excavations. The process involves circulating refrigerated liquids through a series of vertically disposed "freeze" pipes to freeze the ground creating a solid barrier that prevents water intrusion and provides structural support for excavation. As will be described in more detail below, examples of the present disclosures are directed to "zone freeze" pipes or the like, which cause the ground to freeze in selected segments along the pipe, also referred to as zones.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
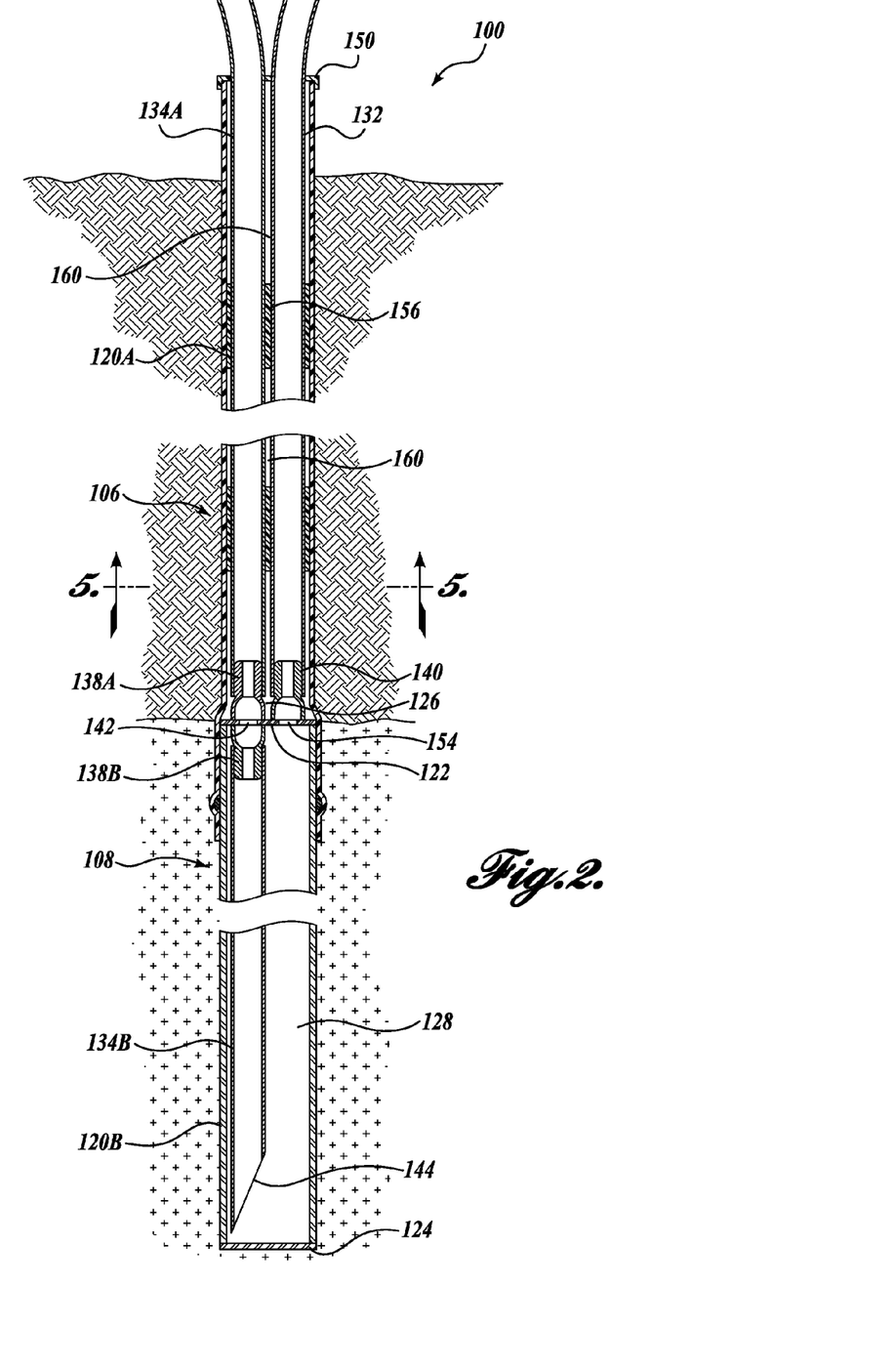
FIG. 2 illustrates one example of a zone freeze pipe in accordance with aspects of the present disclosure.
Figure 3:
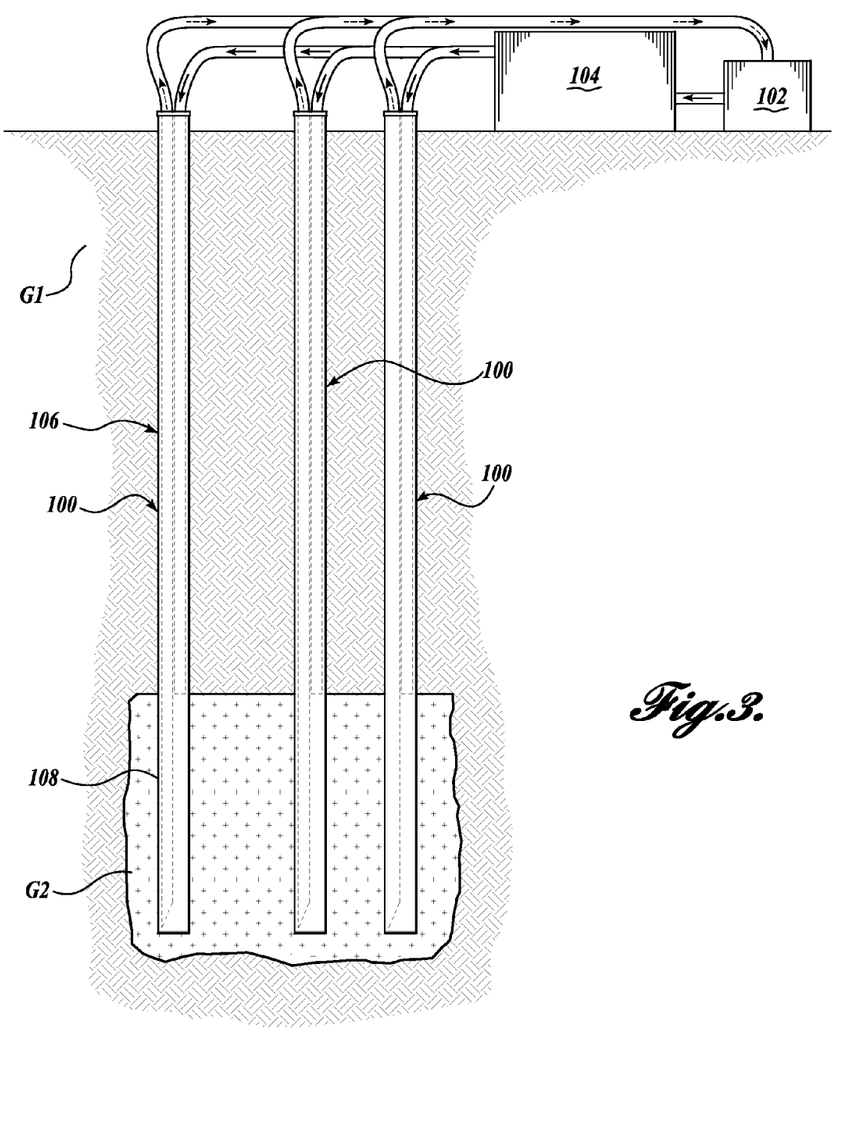
FIG. 3 illustrates an elevational view of one example of a ground freezing application employing the zone freeze pipe of FIG. 2.
Figure 4:
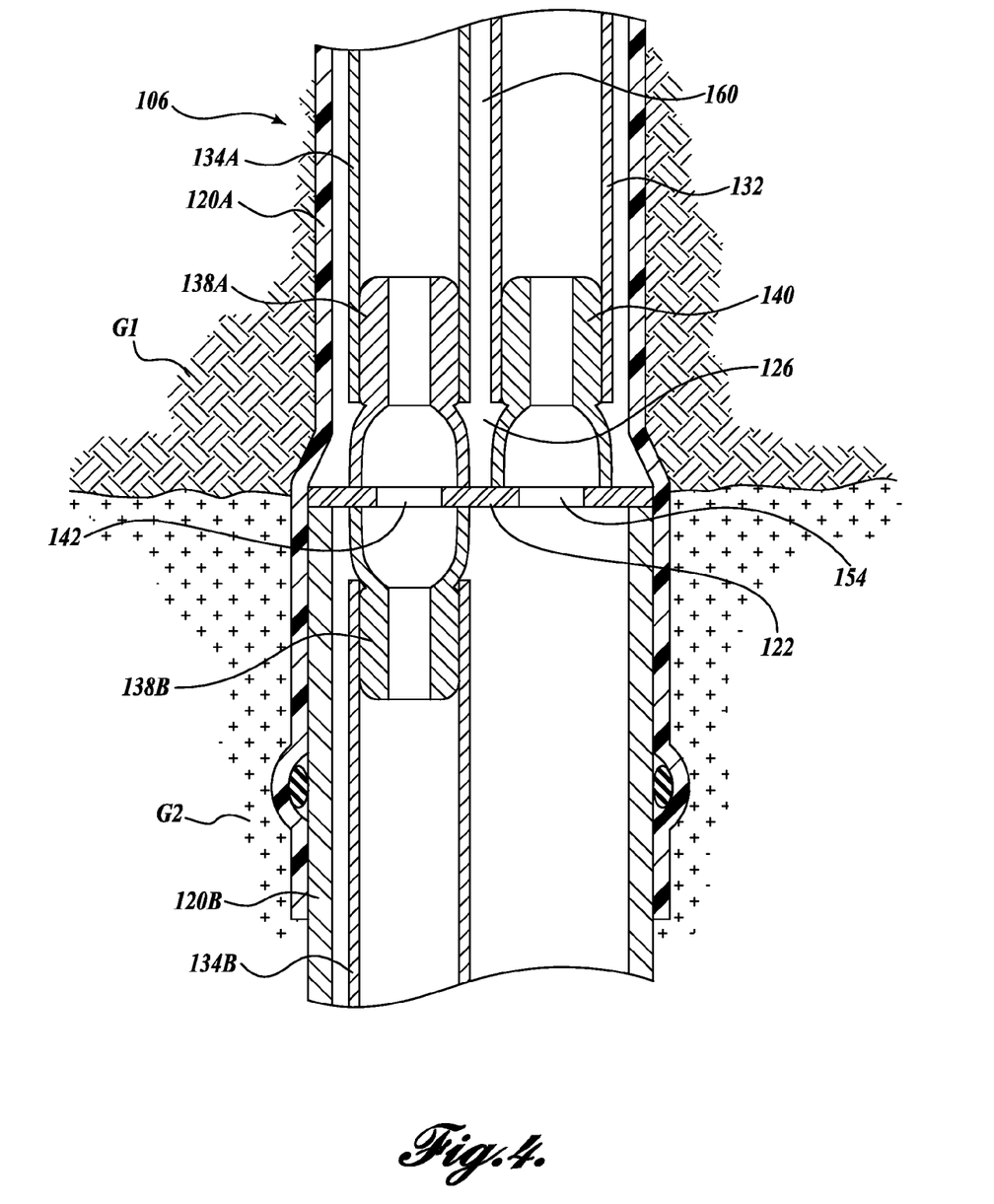
FIG. 4 illustrates an enlarged section of the zone freeze pipe of FIG. 2.
Figure 5:
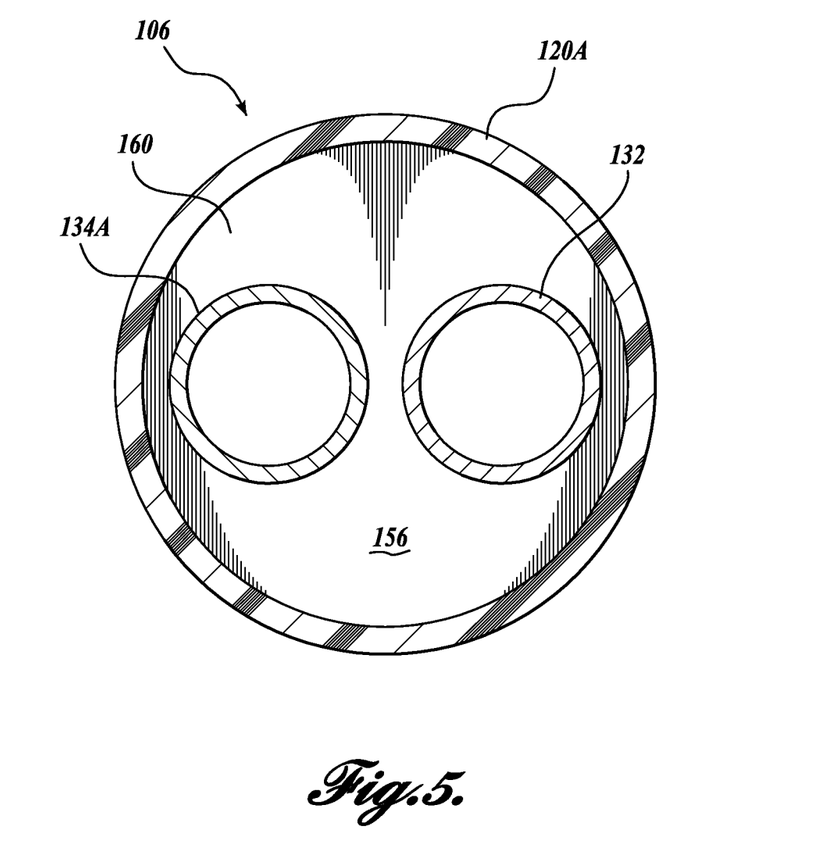
FIG. 5 illustrates a cross sectional view of the zone freeze pipe taken along line 5-5 of FIG. 2.

FIG. 3 illustrates one example of a ground freeze application employing a plurality of zone freeze pipes 100, one of which is shown in grater detail in FIG. 2. In the example illustrated in FIG. 3, the plurality of zone freeze pipes 100 are used create a frozen soil plug beneath a site where, for example, a basement excavation is planned below groundwater level in order to cut off vertical groundwater up from the base of excavation. In that regard, brine, such as a calcium chloride solution, is pumped from a pump 102 to a chiller 104 located above ground, where it is chilled to temperatures as low as −20 F. From the chiller 104, the chilled brine is delivered under pressure to a plurality of zone freeze pipes 100. The chilled brine is circulated through the zone freeze pipes 100 and back, for example, to the pump 102 and/or chiller 104. As chilled brine circulates through the zone freeze pipes 100, heat is extracted from the ground G along at least a portion of its length. It will be appreciated that manifolds, reservoirs, and/or other components may also be used in the circulation of brine through the pump 102, the chiller 104, and the plurality of pipes 100.

Due to different configurations of the sections of the pipe 100, including an upper section 106 and lower section 108, the amount of heat extracted by certain sections, such as section 108, is substantially greater than others, such as section 106. In some embodiments, the lower section 108 extracts heat at about two times (2×) greater than the upper section 106, up to about five times (5×) greater than the upper section or more. As a result, the ground G2 surrounding certain sections, e.g., sections 108, are frozen solid, whereas the ground G1 surrounding the other sections, e.g., sections 106, barely freezes, if at all. This lends to easy excavating of the ground G1 while the ground G2 is frozen solid. In addition, the use of zone freeze pipes significantly reduces the amount of refrigeration and electricity required when compared to the conventional FFP method. When frozen solid, the ground G2 forms a "freeze plug" that provides effective control and/or containment of groundwater.

As discussed briefly above, one example of the zone freeze pipe 100 may comprise the upper and lower sections 106 and 108. In use, as will be described in more detail below, the lower section 108 aims to transfer as much heat from the ground as practical given the design constraints of its intended application, which in turn, causes the ground in proximity of the lower section 108 to freeze solid (e.g., up to about an eight (8) ft radius with sufficient time). As such, the lower section 108 will now be referred to as "lower zone freeze section 108." Contrastingly, the upper section 106 aims to transfer as little heat from the ground as possible given the design constraints of its intended application. In this case, the ground barely freezes, if at all, in the regions surrounding the upper section 106. As such, the upper section 106 will now be referred to as "upper non-zone freeze section 106."

Returning to FIG. 2, one example of the zone freeze pipe 100 will now be described in more detail. As best shown in FIG. 2, the zone freeze pipe 100 includes an outer casing 120, such as a pipe of a predetermined length. In one embodiment, the outer casing 120 is composed of a plastic upper outer pipe section 120A, which extends the entirety of the upper non-zone freeze section 106, and a metal lower outer pipe section 120B, which extends the entirety of the lower zone freeze section 108. Top and bottom metal plates 122 and 124 are welded or otherwise fixedly secured to the proximal and distal ends of the lower outer pipe section 120B. When assembled, the upper outer pipe section 120A is coupled to the lower outer pipe section 120B to form an integral outer pipe 120. As such, the top plate 122 acts as a divider plate to form a cavity 126 of the upper non-zone freeze section 106 and a cavity 128 of the lower zone freeze section 108.

Still referring to FIG. 2, supply and return lines 132 and 134 are positioned within the outer pipe 120. The return line 134 extends along at least a majority of the zone freeze pipe 100 and functions to return chilled brine from the cavity 128 of the lower zone freeze section 108 to the chiller(s). In the embodiment shown, the return line 134 is comprised of upper and lower supply line sections 134A and 134B corresponding to upper non-zone freeze section 106 and lower zone freeze section 108, respectively. The upper and lower return line sections 134A and 134B are connected to upper and lower connector fittings 138A and 138B. The upper and lower connector fittings 138A and 138B, for example, are welded or otherwise mounted to opposite surfaces of the plate 122, and are connected in fluid communication via one or more openings 142 in plate 122. From the upper connector fitting 138A, the upper return line section 134A extends to at least the proximal end of the zone freeze pipe 100. The lower return line section 134B extends away from the lower connector fitting 138B and terminates as an opening 144 near the distal end of the zone freeze pipe 100. As a result, the return line 134 is disposed in fluid communication with the cavity 128 formed by the lower outer pipe section 120B.

Similar to the upper return line section 134A, the supply line 132 extends from at least the proximal end of the zone freeze pipe 100 and terminates at a connector fitting 140, which is coupled (e.g., welded) to the plate 122. The supply line 132 delivers chilled brine from the chiller(s) 104 to the lower cavity 128 of the zone freeze pipe 100. In the embodiment shown, the proximal ends of the supply and return lines 132 and 134 can extend outwardly of the proximal end of the outer pipe section 120. An optional top cap 150 may be coupled to the proximal end of the zone freeze pipe 100, and configured to pass, for example, the supply and return lines 132 and 134 in a supporting manner. In either case, to use the zone freeze pipe 100, the supply line 132 is adapted to receive chilled brine from the chiller 104 (See FIG. 3) and the return line 134 is adapted to return the brine from the lower cavity 128 to the pump 102 (See FIG. 3) or the like. In that regard, the plate 122 further includes one or more openings 154 in fluid communication with the connector fitting 140 such that the lower cavity 128 of the lower zone freeze section 108 is connected in fluid communication with the supply line 132.

Still referring to FIG. 2, centralizers 156 may be used throughout the upper non-zone freeze section 106 at spaced apart locations. The centralizers 156 aim to maintain separation of the supply and return lines 132 and 134 while also providing a stagnant, insulating air gap 160 between the outer pipe section 120A, the supply line 132 and return line 134A.

As briefly described above, the upper non-zone freeze section 106 aims to transmit as little heat from the ground as possible. In that regard, in some applications, the upper outer pipe section 120A can be made of plastic, such as polyvinyl chloride (PVC) or high density polyethylene (HDPE). In some embodiments, the inner diameter of the upper outer pipe section 120A can range from 4 to 6 inches and the thickness of the pipe section walls can be in the range of ¼ to ½ inch. In one embodiment, the upper outer pipe section 120A is a four (4) inch class 200/SDR-21 gasketed PVC pipe. Similarly, in some embodiments, the upper supply line section 132 and return line 134A can be formed by plastic pipe sections, such as HDPE. In some embodiments, the inner diameter of the upper supply line section 132 and upper return line section 134A can range from 1⅛ inch to 1½ inch and the thickness of the pipe walls can be in the range of 3/16 inch to ⅜ inch. In one embodiment, the supply line section 132 and upper return line section 134A can be made from 1¼ inch HDPE/DR 11 pipe. Other pressure rated pipes, such as DR9, can be used, depending on the requirements of the freeze system.

Turning now to the lower zone freeze section 108 of the zone freeze pipe 100, the lower zone freeze section 108 aims to transfer as much heat from the ground to the circulating brine as possible, as briefly discussed above. In that regard, in some applications, the lower outer pipe section 120B can be made of metal, such as steel or aluminum. In one embodiment, the lower outer pipe section can be a four (4) inch schedule 40 steel pipe and the top and bottom plates can be ¼ inch steel. While steel is typically used for most applications due to its strength and heat transfer properties, aluminum or other similar metal may also be used in certain applications. For example, aluminum can be used in tunneling application where a tunnel boring machine (TBM) mines through the ground after the freeze is complete, the brine has been pumped out of the pipe, and the pipe is still present in the frozen soil. In these cases, aluminum is soft enough as to not to cause damage to the TBM machine.

Figure 6:
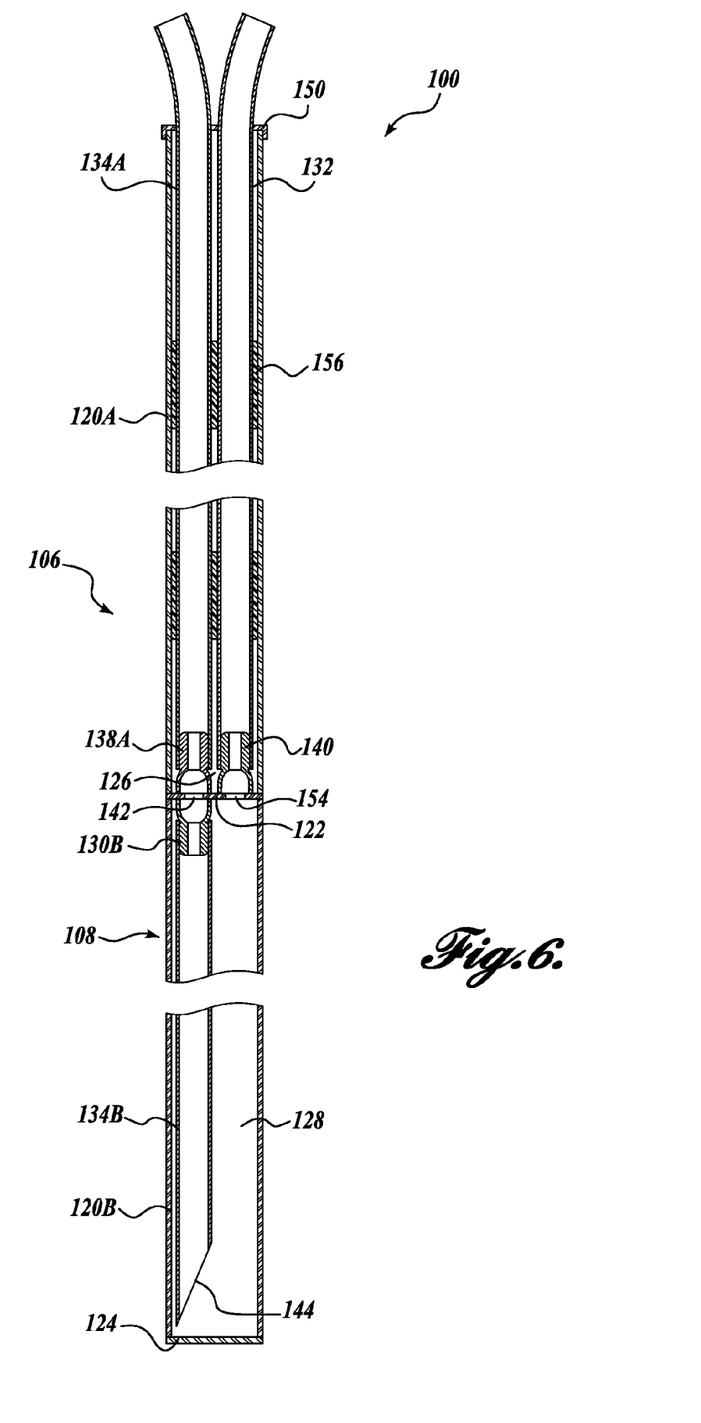
FIG. 6 illustrates another example of a zone freeze pipe in accordance with aspects of the present disclosure.

It will be appreciated that in other applications, for example, where the earth/hydrostatic pressures are sufficiently large (e.g., greater that about 150 feet below ground), the upper outer pipe section 120A can be made of metal, such as steel. However, since plastic is much more efficient in reducing heat flow into the brine, it is intended to be used whenever practical. In embodiments using metal pipe, such as the embodiment of FIG. 6, the diameter of the upper outer pipe section 120A can be somewhat larger (e.g. in the range of five (5) to eight (8) inches. In one embodiment, the supply and return lines 132 and 134 can be made from 1½ inch HDPE/DR 11 pipe (other pressure rated pipe such as DR9 can also be used, depending on the pressure requirements of the freeze system, and the upper outer pipe section 120A can be made from 5 inch Schedule 40 steel pipe. Additionally, in this embodiment, the upper outer pipe section 120A is welded or otherwise secured to the plate 122.

One example method of using the zone freeze pipe 100 will now be described in detail. In that regard, brine, such as a calcium chloride solution, is pumped through a chiller(s) 104 via pump 102 located above ground, where it is chilled to temperatures as low as −20 F. From the chiller 104, the chilled brine is delivered under pressure to a plurality of zone freeze pipes 100 by the supply line 132. This may be accomplished via suitably configured and connected manifold(s) and/or the like. The chilled brine is then circulated through supply line 132, where it exits into the lower cavity 128 from the one or more opening 154. Exiting the one or more opening 154, the chilled brine fills the lower cavity 128. From the lower cavity 128, the brine then flows back through the pipe 100 via the return line 134 to either the pump 102 or chiller 104 as shown in FIG. 3 or to another pipe 100 connected in series. Because of the sealed lines 132 and 134, and sealed connection of the connector fittings 138A, 138B, and 140 to the plate 122, the chilled brine is contained solely in the lower cavity 128.

As chilled brine circulates through the freeze pipes 100, heat is extracted from the ground G at different rates along portions of its length. Because there is relative little thermal resistance between the metal walls of the lower zone freeze section 108 and the circulating brine in the lower cavity 128, significant heat extraction, and therefore soil freezing around the pipe, occurs. Conversely, because the thermal resistance through the upper outer plastic pipe 120A, the stagnant air in air gap 160, and the plastic brine supply and return lines 132 and 134 is relatively high, there is significantly less heat transfer from the ground G1 to the brine within the upper non-freeze section 106. For pipes with upper outer plastic pipe sections, the resulting temperatures on the outside perimeter of the ground G1 are generally above freezing, while for pipes with upper outer metal pipe sections the outside perimeter temperatures are generally below freezing, but significantly warmer than the lower zone freeze section 108. As a result, the ground freezes solid in the regions surrounding the lower freeze pipe sections and barely freezes, if at all, in the regions surrounding the upper sections. Frozen soil is essentially impermeable and very strong (some frozen soil can be nearly ⅓ the strength of concrete in some cases) so as to create an effective groundwater cutoff and shoring mechanism during excavation.

Embodiments of the present disclosure provide advantages over the prior art, some of which will now be described in more detail. The zoned freeze pipe 100 is a specially designed freeze pipe used to freeze solid only portions of the ground at some depth below ground surface while eliminating/reducing the extent of freezing in the zones above this level. This substantially differs from convention ground freezing in that only portions of the ground is frozen solid with the zone freeze pipes while the entire region of ground from the ground surface to the tip of the freeze pipe is frozen with convention methods. One of the benefits of using the zone freeze pipes 100 is that significantly less energy (e.g., chiller tonnage) is required to create a frozen soil zone than for conventional freezing. Other benefits include easier excavation of soils above the frozen plug, less electricity, and reduced manifold line and pump sizes. Experimental tests indicate that the chiller capacity using zone freeze pipes 100 can be reduced by more than 50% of that required using the conventional freeze pipe methods, depending on the depth of freezing, soil properties, and zone freeze pipe properties.

Embodiments of the zone freeze pipe 100 may be employed in the following applications, among others: 1) creation of a frozen soil plug at large depths below ground surface for sealing the end of a tunnel boring machine (TBM) so that repairs can be safely made by workers at the TBM face; 2) creation of a frozen soil plug beneath a site where a basement excavation is planned below groundwater level to cut off vertical groundwater up from the base of excavation; 3) creation of a frozen plug of soil below the base of an excavation inside a deep TBM access shaft to cut off vertical groundwater inflow and stabilize soils at the base; 4) creation of an impermeable groundwater cutoff at depths below ground surface to prevent horizontal movement of contamination through, into, or out of a site, etc.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A system for promoting ground freezing, comprising:
    a freeze pipe, comprising:
        an upper section having a first heat transfer coefficient, wherein the upper section includes an outer upper casing section that defines an upper section cavity;
        a lower section having a second heat transfer coefficient that is higher than the first heat transfer coefficient of the upper section, wherein the lower section includes an outer lower casing section that defines a lower section cavity that is fluidly isolated from the upper section cavity;
        a supply line extending through the outer upper casing section and disposed in fluid communication with the lower section cavity at an upper portion thereof, wherein the supply line is adapted to receive chilled fluid and transfer the chilled fluid to the lower section cavity; and
        a return line extending through the upper casing section and disposed in fluid communication with the lower section cavity at a lower portion thereof, wherein the return line is spaced a distance from the supply line so that an insulating air gap is formed between the supply line, the return line, and the outer upper casing section;
    a quantity of brine disposed within the return and supply lines;
    a pump configured to circulate the brine through the supply and return lines; and
    a chiller configured to remove heat from the circulating brine, wherein the circulation of the brine through the freeze pipe promotes freezing of soil adjacent to the lower section of the freeze pipe.

2. The system of claim 1, wherein the outer lower casing section includes metal.

3. The system of claim 1, wherein the outer upper casing section includes plastic.

4. The system of claim 1, wherein the supply line is configured to deliver chilled fluid to the lower cavity and the return line is configured to remove the chilled fluid from the lower cavity.

5. The system of claim 2, wherein chilled fluid supplied to the lower cavity is disposed in direct heat transfer relationship with the metal lower casing.

6. The system of claim 2, wherein the metal lower casing further includes a metal divider plate fixedly secured to a top section of the metal lower casing, wherein the metal divider plate provides an enclosed cavity having a fixed volume and provides fluid separation between the upper section cavity and the lower section cavity.

7. The system of claim 1, wherein the lower section further includes a divider plate that provides a fixed volume to the lower section cavity and provides fluid separation between the lower section cavity and the upper section cavity.

8. The system of claim 1, wherein the lower section is configured to extract heat about 200% more than the upper section.

9. The system of claim 7, wherein the lower section is configured to extract heat about 500% more than the upper section or more.

10. The system of claim 3, wherein the outer upper casing section is one of:
    (a) a pipe having an inner diameter in the range from 4 to 6 inches and a wall thickness in the range of ¼ to ½ inch; and
    (b) a 4-inch class 200/SDR-21 gasketed PVC pipe.

11. The system of claim 3, wherein the supply line and the return line are plastic conduits.

12. The system of claim 11, further comprising plastic centralizers configured to maintain separation of the supply and return lines.

13. The system of claim 11, wherein the supply line and the return line are each one of:
    (a) a pipe having an inner diameter in the range from 1⅛ inches to 1½ inches and a wall thickness in the range of 3/16 inch to ⅜ inch; and
    (b) a 1¼ inch HDPE/DR 11 pipe.

14. The system of claim 2, wherein the lower outer section is a 4-inch schedule 40 metal pipe.

15. A system for promoting ground freezing, comprising:
    a source of chilled brine solution;
    a pump coupled to the source of chilled brine solution; and
    at least one zone freeze pipe that includes
        a plastic upper section having a first heat transfer coefficient and a metal lower section having a second heat transfer coefficient that is higher than the first heat transfer coefficient of the upper section;
        an upper section cavity disposed in the upper section, the upper section cavity having a fixed volume;
        a lower section cavity disposed in the lower section, the lower section cavity having a fixed volume;
        a divider disposed between the upper section cavity and the lower section cavity, wherein the divider provides fluid separation between the upper section cavity and the lower section cavity;
        a plastic supply line that extends through the upper section cavity and is disposed in fluid communication with the lower section cavity at an upper portion thereof adjacent the divider, wherein the supply line is connected in fluid communication with the source of chilled brine solution for transferring the chilled brine solution to the lower section cavity; and
        a plastic return line that extends through the upper section cavity and is disposed in fluid communication with the lower section cavity at a lower portion thereof, wherein the return line is spaced a distance from the supply line so that an insulating air gap is formed within the upper section cavity and between the supply line and the return line.

16. The system of claim 15, wherein the at least one zone freeze pipe further includes at least one plastic centralizer configured to maintain separation of the supply and return lines.

17. A method for promoting ground freezing, comprising:
    obtaining a zone freeze pipe that includes an upper section having a first heat transfer coefficient and a lower section having a second heat transfer coefficient that is higher than the first heat transfer coefficient of the upper section, wherein the upper section includes an outer upper casing section that defines an upper section cavity and wherein the lower section includes an outer lower casing section that defines a lower section cavity that is fluidly isolated from the upper section cavity;

a supply line extending through the outer upper casing section and disposed in brine communication with the lower section cavity, wherein the supply line is adapted to receive chilled brine and transfer the chilled brine to the lower section cavity; and a return line extending through the upper casing section and disposed in brine communication with the lower section cavity, wherein the return line is spaced from the supply line so that an insulating air gap is formed between the supply line, the return line, and the outer upper casing section placing the zone free pipe such that the lower section is adjacent to soil intended to be frozen; and circulating chilled brine through the supply and return pipes so as to initiate freezing of said soil.

18. The method of claim 17, wherein said placing the zone freeze pipe including placing the zone free pipe such that the lower section is adjacent to soil intended to be frozen and is less than 150 feet from the ground surface.

\* \* \* \* \*